(12) United States Patent
Ueno et al.

(10) Patent No.: US 7,945,340 B2
(45) Date of Patent: May 17, 2011

(54) PROGRAMMABLE CONTROLLER SYSTEM

(75) Inventors: Shintaro Ueno, Kusatsu (JP); Hajime Izutani, Mishima (JP)

(73) Assignee: Omron Corporation, Kyoto (JP)

(*) Notice: Subject to any disclaimer, the term of this patent is extended or adjusted under 35 U.S.C. 154(b) by 1427 days.

(21) Appl. No.: 11/373,507

(22) Filed: Mar. 13, 2006

(65) Prior Publication Data

US 2006/0253626 A1 Nov. 9, 2006

(30) Foreign Application Priority Data

Mar. 14, 2005 (JP) ................ P2005-072094
Mar. 14, 2005 (JP) ................ P2005-072096

(51) Int. Cl.
*G05B 9/02* (2006.01)
*G05B 11/01* (2006.01)
*G06F 13/00* (2006.01)
*G06F 15/16* (2006.01)

(52) U.S. Cl. ........... 700/79; 700/21; 702/209; 702/211; 710/110

(58) Field of Classification Search .............. 700/2, 3, 700/5, 9, 21, 79, 80; 702/188; 709/208, 709/209, 210, 211; 710/110
See application file for complete search history.

(56) References Cited

U.S. PATENT DOCUMENTS

| 5,410,469 | A | 4/1995 | Sakamoto et al. | |
|---|---|---|---|---|
| 7,050,860 | B2 * | 5/2006 | Muneta et al. | 700/3 |
| 7,369,902 | B2 * | 5/2008 | Nakayama et al. | 700/3 |
| 2003/0004686 | A1 * | 1/2003 | Ueno et al. | 702/188 |
| 2004/0215354 | A1 * | 10/2004 | Nakamura et al. | 700/21 |

FOREIGN PATENT DOCUMENTS

| EP | 1 260 893 | 11/2002 |
|---|---|---|
| EP | 1 396 771 | 3/2004 |
| GB | 2 292 620 | 2/1996 |
| JP | 02-207159 | 8/1990 |
| JP | 04-352008 | 12/1992 |
| JP | 2000-029513 | 1/2000 |
| JP | 2000-216798 | 8/2000 |
| JP | 2003-150211 | 5/2003 |
| JP | 2003-295914 | 10/2003 |

* cited by examiner

*Primary Examiner* — Albert Decady
*Assistant Examiner* — Jennifer L Norton
(74) *Attorney, Agent, or Firm* — Foley & Lardner LLP

(57) ABSTRACT

A programmable controller system includes a programmable controller apparatus, a remote input and output apparatus connected to the programmable controller apparatus via a field bus and a monitoring apparatus configured to be located on a communication path between the programmable controller apparatus and the remote input and output apparatus and to monitor a communication data therebetween. The monitoring apparatus includes a rewritable tag for prescribing a condition for issuing a transmission request command with respect to an external equipment deterioration diagnosis and a command issuing part issues a transmission request command required for the external equipment deterioration diagnosis with reference to the tag. A preferable data logging operation is carried out properly without any PLC operation.

7 Claims, 19 Drawing Sheets

| Time tag | Start condition | | | | Stop condition | | | |
|---|---|---|---|---|---|---|---|---|
| | IN/OUT | Contact No. | Edge | Number of time | IN/OUT | Contact No. | Edge | Number of time |
| T1 | OUT | 1 | ON | 1 | IN | 1 | OFF | 1 |
| T2 | IN | 1 | OFF | 1 | IN | 2 | ON | 1 |
| ... | | | | | | | | |

Fig. 5A  Slave No. 2

| Time tag | Start condition | | | | Stop condition | | | |
|---|---|---|---|---|---|---|---|---|
| | IN/OUT | Contact No. | Edge | Number of time | IN/OUT | Contact No. | Edge | Number of time |
| T1 | OUT | 1 | ON | 1 | IN | 1 | OFF | 1 |
| T2 | IN | 1 | OFF | 1 | IN | 2 | ON | 1 |
| ... | | | | | | | | |

Fig. 5B  Slave No. 3

| Time tag | Timing | | | |
| --- | --- | --- | --- | --- |
| | Node | IN/OUT | Contact | Edge |
| Node2_T1 | 2 | IN | 2 | ON |
| Node2_T2 | 2 | IN | 2 | ON |
| Node3_T1 | 3 | IN | 2 | ON |
| Node3_T2 | 3 | IN | 2 | ON |
| . . | | | | |

Fig. 6A  Settings of retrieving timing

| Calculation tag | Calculation equation |
| --- | --- |
| Y1 | Node2_T1*Node2_T2 |
| Y2 | Node3_T1*Node3_T2 |
| . . | |

Fig. 6B  Settings of calculation tag

Fig. 8A Slave (No. 2)

(Time tag)

| Time tag | Start condition | | | | Stop condition | | | |
|---|---|---|---|---|---|---|---|---|
| | IN/OUT | Contact No. | Edge | Number of time | IN/OUT | Contact No. | Edge | Number of time |
| T1 | OUT | 1 | ON | 1 | IN | 1 | OFF | 1 |
| T2 | IN | 1 | OFF | 1 | IN | 2 | ON | 1 |
| ... | | | | | | | | |

(Calculation tag)

| Calculation tag | Calculation equation |
|---|---|
| X1 | Node2_T1*Node2_T2 |

Fig. 8B Slave (No. 3)

(Time tag)

| Time tag | Start condition | | | | Stop condition | | | |
|---|---|---|---|---|---|---|---|---|
| | IN/OUT | Contact No. | Edge | Number of time | IN/OUT | Contact No. | Edge | Number of time |
| T1 | OUT | 1 | ON | 1 | IN | 1 | OFF | 1 |
| T2 | IN | 1 | OFF | 1 | IN | 2 | ON | 1 |
| ... | | | | | | | | |

(Calculation tag)

| Calculation tag | Calculation equation |
|---|---|
| X1 | Node2_T1*Node2_T2 |

Fig. 9

| | Trigger to retrieve | | | | Retrieve data | |
|---|---|---|---|---|---|---|
| | Node | IN/OUT | Contact | Edge | Node | Calculation tag |
| Y1 | 2 | IN | 2 | ON | 2 | X1 |
| Y2 | 3 | IN | 2 | ON | 3 | X1 |
| : | | | | | | |

Fig. 12

| Tag | Slave No. | Time tag | Calculation data | | | | Data log timing | | |
|---|---|---|---|---|---|---|---|---|---|
| | | | Variation coefficient A | Number of time/time | Number of sampling/time | IN/OUT | Connection No. | Edge | |
| | | | | Number of time | | | | | |
| Y1 | 2 | T1 | 4 | | 100 | IN | 1 | ON | |

Fig. 14

| Offset | Value | Calculation data |
|---|---|---|
| +0 | 10hex | Service = set Data command |
| +1 | 97hex | Class = Operation time monitor class |
| +2 | | Instance = 1 (T1) |
| +3 | 67hex | Attribute = Threshold value |
| +4 | T | Data L |
| +5 | | DataH |

Time tag setting of slave 2

| Time tag | Start condition | | | | Stop condition | | |
|---|---|---|---|---|---|---|---|
| | IN/OUT | Contact No. | Edge | Number of time | IN/OUT | Contact No. | Edge | Number of time |
| T1 | OUT | 1 | ON | 1 | IN | 1 | OFF | 1 |

Fig. 16A  Each condition of start and stop

Image of calculation parameter settings of slave

| Time tag | Variation coefficient A | Number of sampling/time |
|---|---|---|
| T1 | 4 | 100 |

Fig. 16B  Calculation parameter $$\sigma = \sqrt{\sum x_i^2/(n-1) - (\sum x_i)^2/n(n-1)} \qquad \text{Equation}$$

Fig. 19A  Modified equation of standard deviation

Fig. 19B  Flowchart corresponding to modified equation

PROGRAMMABLE CONTROLLER SYSTEM

This application claims priority from Japanese patent applications JP P2005-072096, filed on Mar. 14, 2005, and JP P2005-072094, filed on Mar. 14, 2005. The entire contents of each of the aforementioned applications are incorporated herein by reference.

BACKGROUND OF THE INVENTION

1. Field of the Invention

The present invention relates to a programmable controller system configured to notify deterioration diagnosis result of an external equipment implemented by a remote input/output apparatus to a programmable controller apparatus via communication path, so that the deterioration diagnosis result can be referred directly with a ladder diagram.

2. Description of the Related Art

Prior to this application, the applicant has proposed a programmable controller system (hereinafter, referred to as PLC system) configured to notify deterioration diagnosis result of an external equipment implemented by a remote input/output apparatus to a programmable controller apparatus via communication path, so that the deterioration diagnosis result can be referred (for example, see Japanese Patent Application Laid-Open No. 2003-295914).

According to such PLC system, as conventional, message communication process for retrieving data related to deterioration diagnosis from a remote input/output apparatus is not required to be loaded to user program of the PLC. Accordingly, various effects are achieved such that effort for producing user program is reduced, or delay of cycle time due to executing such maintenance user program executed simultaneously with the original control user program is reduced.

This type of external equipment deterioration diagnosis is configured to obtain time lag between a predetermined signal edge (raising edge or falling edge) of one terminal constituting each of one or more input/output terminal (for example OUT1 and IN1, IN1 and IN2, . . . ) of a remote input/output apparatus and a predetermined signal edge (raising edge or falling edge) of the other terminal, generate deterioration characteristic amount based on the one or more time lag data obtained in such manner (in case of one pair of terminals, the deterioration characteristic amount may be the time lag itself), and compares the deterioration characteristic amount with a predetermined deterioration determination threshold value (TH) in order to diagnose and predict deterioration of an external equipment relative to the pairs of terminals. Here, the threshold value (TH) may include a higher threshold value (TH-H) and a lower threshold value (TH-L).

When such deterioration diagnosis function is included in a slave of the PLC system, for example, it is connected to an external equipment so as to load sensor inputs at IN1 starting with the operation complete position of the external equipment at the timing of activating the external equipment at OUT1, thus enabling obtaining the operation time of the external equipment. Accordingly, by comparing the operation time with the predetermined deterioration diagnosis threshold value, serial deterioration diagnosis is realized for the external equipment (which may be a specific actuator or a series of operative mechanism including a specific actuator).

In order to introduce such external equipment deterioration diagnosis function to the PLC system, a proper deterioration diagnosis threshold value (TH, or TH-H and TH-L) is needed to be determined in advance. For this, process for storing (so-called logging process) is required to store measurement values of time lag relative to each relevant pair of terminals (measurement value is obtained by the remote input/output apparatus itself while operating the PLC apparatus and the remote input/output apparatus in actual. The logging process sometimes requires one or two month according to types of the apparatus or system to be controlled.

Conventionally, the logging process is carried out by installing a logging program, which is for transferring time lag data generated in the remote input/output apparatus to the PLC apparatus and storing in the user program itself of the PLC apparatus constituting the PLC system.

FIG. 10 is a ladder diagram showing an example of user program for such logging program. This program is configured to obtain time lag (T1) between a predetermined signal edges of a first pair of terminals (OUT1 and IN1) and time lag (T2) between a predetermined signal edges of a second pair of terminals (IN1 and IN2) in response to a predetermined edge (raising edge) of a predetermined terminal (IN2) and to store them to an input/output memory in the PLC apparatus.

In the drawing, since the operation codes, MOV, SEND, and INC, are well known to a person skilled in the art, explanation for those is omitted here. Further, in the rectangle blocks surrounding the operation codes, a large number of arrays of instruction words required to realize necessary functions are listed in actual.

Therefore, when a plurality of remote input/output apparatuses exist and a plurality of subjects of deterioration diagnosis exist in each apparatus, programs shown in FIG. 10 for respective subjects of deterioration diagnosis is required to be written in user program, so that large amount of effort is required. In addition, when a program for such logging process is added, entire volume of the user program is increased. Accordingly, cycle time in the PLC apparatus will be slightly varies from the cycle time when the system is operative and reliability of time lag data obtained in such condition cannot be always assured.

The present invention has been made in view of the above problems and has an object of reducing effort for determining a threshold value, for example, at an introduction of PLC system including the above type of external equipment deterioration diagnosis function and collecting data with high reliability by maintaining constant operation even when system is being introduced or operative.

Other objects and effects of the present invention will be appreciated easily by a person skilled in the art with reference to the following description of the specification.

SUMMARY OF THE INVENTION

A programmable controller system of the present invention includes a programmable controller apparatus, a remote input and output apparatus connected to the programmable controller apparatus via a field bus, and a monitoring apparatus configured to be located on a communication path between the programmable controller apparatus and the remote input and output apparatus and passively monitor communication data therebetween.

The programmable controller apparatus includes at least an input unit, an output unit, an input and output memory, a program memory, an input and output update device, and a program execution device.

The input unit is for retrieving signal from an external equipment and the output unit is for transmitting signal to the external equipment.

The input and output memory has at least an input region for storing input data corresponding to signal retrieved by the input unit of the programmable controller apparatus, an output region for storing output data corresponding to signal to be transmitted from the output unit of the programmable controller apparatus, a remote input region for storing input data corresponding to signal retrieved by the remote input and output apparatus, a remote output region for storing remote output data corresponding to signal to be transmitted from the remote input and output apparatus, and a deterioration diagnosis flag configured to be referred in accordance with user's instruction. Here, it says "at least" since other regions such as data region and parameter region exist in usual. The input and output memory stores a preferable control specification which is written according to user's instruction.

The input and output update device is configured to carry out an input and output update process for transmitting and receiving data between the input and output apparatus unit of the programmable controller apparatus and the input and output region of the input and output memory via an internal bus and a remote input and output update process for transmitting and receiving data between the remote input and output apparatus and the remote input and output update region of the input and output memory via field bus.

The deterioration diagnosis flag control device is configured to control of on and off of the deterioration diagnosis flag according to deterioration diagnosis result notified from the remote input and output apparatus via filed bus.

The program execution device is configured to execute user program stored in the program memory with reference to content of the input and output memory and to rewrite content of the output region and the remote output region of the input and output memory according to the execution result.

With the functions of the input and output update device and the program execution device, an operation regulated by user program is assured in the PLC apparatus and the remote input and output apparatus. With the function of the deterioration diagnosis flag control device, a preferable deterioration diagnosis program can be made with reference to the deterioration diagnosis flag on the user program.

The remote input and output apparatus includes at least an input unit, an output unit, an input and output update device, a time lag measurement device, one or more time lag register, a deterioration diagnosis device, and a diagnosis result notification device.

The input unit is configured to retrieve signal from the external equipment and the output unit is configure to transmit signal to the external equipment.

The input and output update device is for transmitting input data corresponding to signal retrieved by the input unit to the programmable controller apparatus via field bus and transmitting output data corresponding to signal received from the programmable controller apparatus via field bus from the output unit. With the function of the input and output update device, since communication of input and output signals with external equipment via the input unit and the output unit is carried out, control of the external equipment can be realized.

The time lag measurement device is for measuring time lag between a predetermined signal edge of one terminal and a predetermined signal edge of the other terminal of one or more predetermined pair of terminals constituting the input unit or output unit. One or more time lag registers are for primarily storing time lags of each pair of terminals obtained by the time lag measurement device. The deterioration diagnosis device is for comparing deterioration characteristic amount generated based on one or more time lags stored in the time lag registers with a predetermined threshold value and diagnosing deterioration of the external equipment relative to the pair of terminals. With functions of the time lag measurement device and the deterioration diagnosis device, a deterioration diagnosis result relative to the external equipment is generated in the remote input and output apparatus.

The diagnosis result notification device is for notifying the deterioration diagnosis result obtained by the deterioration diagnosis device to the programmable controller apparatus via field bus. With this, the deterioration diagnosis result generated in the remote input and output apparatus is automatically notified to the programmable controller apparatus without any involvement of user program.

The monitoring apparatus for passively monitoring communication data transmitted between the programmable controller apparatus and the remote input and output apparatus includes a transmission request command issue device, a data storing device, and a stored data output device.

The transmission request command issue device is for passively monitoring communication data transmitted between the programmable controller apparatus and the remote input and output deice to oversee signal state of the predetermined terminal of the input unit or the output unit of the remote input and output apparatus and issuing a transmission request command to request transmission of time lag or deterioration characteristic amount to the remote input and output apparatus via message communication supported by the field bus in response to a detection of an edge of the signal state in a predetermine direction.

The data storing device is for receiving time lag or deterioration characteristic amount from the remote input and output apparatus in response to the transmission request command and storing to a predetermined memory.

The stored data output device is for outputting a series of data stored in a predetermine memory by the data storing device to external in response to a predetermined reading operation.

Further, the remote input and output apparatus includes a transmission request command processing device for transmitting, as a response, the time lag primarily stored in the time lag register or the deterioration characteristic amount generated based on the time lag to the originating device of a predetermine transmission request command in response to the reception of the command via message communication.

With functions of the transmission request command issue device, the data storing device, the stored data output device, and the transmission request command processing device, the monitoring apparatus for passively monitoring communication data transmitted between the programmable controller apparatus and the remote input and output apparatus collects and stores data required for generating threshold value for deterioration diagnosis in order to retrieve the data as required without any involvement of user program.

With such construction, efforts for determining threshold value can be reduced, for example, in case of introduction, in the PLC system including this type of external equipment deterioration diagnosis function. Also, since its constant operation is assured during the introduction and during the system operation, data with high reliability can be collected.

According to the present invention, the monitoring apparatus located on a communication path between the programmable controller apparatus and the remote input and output apparatus and passively monitoring communication data transmitted therebetween may be provided separately from the programmable controller apparatus and the remote input and output apparatus and may be a passive monitor capable of monitoring communication data.

Further, according to the present invention, the monitoring apparatus located on a communication path between the programmable controller apparatus and the remote input and output apparatus and passively monitoring communication data transmitted therebetween may be provided in the programmable controller apparatus and may be a master unit for carrying out communication with the remote input and output apparatus via field bus. For example, a function similar to the passive monitor can be realized by obtaining communication data transmitted through the master unit from a sheared memory.

According to a preferred embodiment of the present embodiment, the following structure may be employed. In the embodiment, a time lag measurement device in the remote input and output apparatus measures a time lag (T1) between a predetermined signal edge of a first terminal in the output unit and a predetermined signal edge of a first terminal in the input unit and a time lag (T2) between a predetermined signal edge of the first terminal in the input unit and a predetermined signal edge of a second terminal in the input unit.

One or more time lag registers in the remote input and output apparatus include a first time lag register for primarily storing the time lag (T1) and a second time lag register for primarily storing the time lag (T2).

The deterioration diagnosis device in the remote input and output apparatus compares the deterioration characteristic amount (T1×T2) generated based on the time lag (T1) stored in the first time lag register and the time lag (T2) stored in the second time lag register with a predetermined threshold value (TH) to diagnose deterioration of the external equipment relative to the pair of terminals.

The monitoring apparatus configured to passively monitor communication data transmitted between the programmable controller apparatus and the remote input and output apparatus includes a command issue device, a data storing device, and a stored data output device having the following configurations.

Specifically, the command issue device is for passively monitoring communication data transmitted between the programmable controller apparatus and the remote input and output apparatus to oversee signal state of the second terminal of the input unit of the remote input and output apparatus, and issuing the transmission request command to request time lags (T1, T2) or the deterioration characteristic amount (T1×T2) to the remote input and output apparatus via message communication supported by the field bus in response to the detection of the edge of the signal state in a predetermine direction.

The data storing device is for receiving the time lags (T1, T2) or the deterioration characteristic amount (T1×T2) transmitted from the remote input and output apparatus as a response to the transmission request command and storing to a predetermined memory.

The stored data output device is for outputting a series of data stored in the predetermined memory by the data storing device to external in response to a predetermined reading operation.

Further, the remote input and output apparatus includes a command processing device for transmitting, as a response, the time lags (T1, T2) primarily stored in the time lag registers or the deterioration characteristic amount (T1×T2) generated based on the time lags to the originating device of a predetermined transmission request command in response to the reception of the command via message communication.

With such structure, when application is made so that a predetermine signal edge is generated in the first terminal in the output unit, the first terminal in the input unit, and the second terminal in the input unit sequentially in order, the time lag (T1) is a value corresponding to amount of time required to be activated in actual since an activating instruction is given to the device and the time lag (T2) corresponds to amount of time required to ends operation since activation is started. Accordingly, the value of the deterioration characteristic amount (T1×T2) represents both of degree of deterioration of the actuator and degree of deterioration of the external equipment. Therefore, degree of deterioration can be accurately recognized.

According to a preferable embodiment of the present invention, the remote input and output apparatus may include a rewritable tag for prescribing timekeeping start condition and timekeeping end condition required for obtaining one or more time lags with respect to an external equipment deterioration diagnosis and the time lag measurement device may measure each time lag required for the external equipment deterioration diagnosis with reference to the tag.

With such structure, proper setting is set to the tag, a preferable deterioration diagnosis operation can be carried out in the remote input and output apparatus.

According to a preferable embodiment of the present invention, the monitoring apparatus located on a communication path between the programmable controller apparatus and the remote input and output apparatus and passively monitoring communication data transmitted therebetween may include a rewritable tag for prescribing a condition for issuing a transmission request command with respect to an external equipment deterioration diagnosis and the command issuing device may issue a transmission request command required for the external equipment deterioration diagnosis with reference to the tag.

With such structure, a preferable data logging operation can be carried out properly in the monitoring apparatus configured to be located on a communication path between the programmable controller apparatus and the remote input and output apparatus and passively monitor communication data therebetween.

Further, the programmable controller system of the present invention is a system in which a threshold value setting support apparatus having the following functions is added to a system having a programmable controller apparatus and remote input and output apparatus connected each other with communications via field bus. The threshold value setting support apparatus includes a data collecting device for collecting data corresponding to time lag or deterioration characteristic amount generated within the remote input and output deice without requiring to add a data collection function to user program of the programmable controller system, a threshold value determination device for determining a deterioration diagnosis threshold value in use of a statistical method based on the data corresponding to the time lag or deterioration characteristic amount collected by the data collecting device, and a threshold value setting device for setting the deterioration diagnosis threshold value determined by the threshold value determination device to the remote input and output apparatus. The programmable controller apparatus, which constitutes the same system, includes at least an input unit, an output unit, an input and output memory, a program memory, an input and output update device, a deterioration diagnosis flag control device, and a program execution device. The input unit is for retrieving signal from external equipment and the output unit is for transmitting signal to the external equipment. The input and output memory has at least an input region for storing input data corresponding to signal retrieved by the input unit of the programmable controller apparatus, an output region for storing output data corresponding to signal to be transmitted from the output unit of the programmable controller apparatus, a remote input region for storing input data corresponding to signal retrieved by the remote input and output apparatus, a remote output region for storing remote output data corresponding to signal to be transmitted from the remote input and output apparatus, and a deterioration diagnosis flag configured to be referred in accordance with user's instruction. Here, it says "at least" since other regions such as data region and parameter region exist in usual. The input and output memory stores a preferable control specification which is written according to user's instruction. The input and output update device is configured to carry out an input and output update process for transmitting and receiving data between the input and output unit of the programmable controller apparatus and the input and output region of the input and output memory via an internal bus and a remote input and output update process for transmitting and receiving data between the remote input and output apparatus and the remote input and output region of the input and output memory via field bus. The deterioration diagnosis flag control device is configured to control of tuning on and off of the deterioration diagnosis flag according to deterioration diagnosis result notified from the remote input and output apparatus via filed bus. The program execution device is configured to execute user program stored in the program memory with reference to content of the input and output memory and to rewrite content of the output region and the remote output region of the input and output memory according to the execution result. With functions of the input and output update device and the program execution device, an operation regulated by user program is assured in the PLC apparatus and the remote input and output apparatus. With a function of the deterioration diagnosis flag control device, a preferable deterioration diagnosis program can be made with reference to the deterioration diagnosis flag on the user program. The remote input and output apparatus includes at least an input unit, an output unit, an input and output update device, a time lag measurement device, one or more time lag register, a deterioration diagnosis device, and a diagnosis result notification device. The input unit is for retrieving signal from the external equipment and the output unit is for transmitting signal to the external equipment. The input and output update device is for transmitting input data corresponding to signal retrieved by the input unit to the programmable controller apparatus via field bus and transmitting output data corresponding to signal received from the programmable controller apparatus via field bus from the output unit. With the function of the input and output update device, since communication of input and output signals with the external equipment via the input unit and the output unit is carried out, control of the external equipment can be realized. The time lag measurement device is for measuring time lag between a predetermined signal edge of one terminal and a predetermined signal edge of the other terminal of one or more predetermined pair of terminals constituting the input unit or output unit. One or more time lag registers are for primarily storing time lags of each pair of terminals obtained by the time lag measurement device. The deterioration diagnosis device is for comparing deterioration characteristic amount generated based on one or more time lags stored in the time lag registers with a predetermined threshold value and diagnosing deterioration of the external equipment relative to the pair of terminals. With functions of the time lag measurement device and the deterioration diagnosis device, deterioration diagnosis result relative to the external equipment is generated in the remote input and output apparatus. The diagnosis result notification device is for notifying the deterioration diagnosis result obtained by the deterioration diagnosis device to the programmable controller apparatus via field bus. With this, the deterioration diagnosis result generated in the remote input and output apparatus is automatically notified to the programmable controller apparatus without any involvement of user program.

With such structure, the threshold value setting support apparatus includes a data collecting device for collecting data corresponding to time lag or deterioration characteristic amount generated within the remote input and output deice without requiring to add a data collection function to user program of the programmable controller system, a threshold value determination device for determining a deterioration diagnosis threshold value in use of a statistical method based on the data corresponding to the time lag or deterioration characteristic amount collected by the data collecting device, and a threshold value setting device for setting the deterioration diagnosis threshold value determined by the threshold value determination device to the remote input and output apparatus. Accordingly, efforts for determining threshold value can be reduced, for example, in case of introduction, in the PLC system including this type of external equipment deterioration diagnosis function. Also, threshold value can be determined without waiting for, as conventional, large amount of data stored by logging process, so that amount of time required for determining threshold value can be reduced. Further, since its constant operation is assured during the introduction and during the system operation, data with high reliability can be collected.

According to the present invention, the threshold value determination device may include a first calculation device for obtaining an average value of a series of data sampled by the data correcting device, a second calculation device for obtaining a standard deviation of a series of sampled data based on the average value of series of data obtained by the first calculation device and every sampled data, and a third calculation device for obtaining a deterioration diagnosis threshold value based on the average value obtained by the first calculation device, the standard deviation obtained by the second calculation device, and a predetermined variation coefficient.

With such structure, since threshold value is determined with reference to the standard deviation and the variation coefficient, the determined threshold value distinguishes deterioration state and non-deterioration state. Therefore, the reliability of deterioration diagnosis result can be improved.

Further, according to another preferred embodiment of the present invention, the threshold value setting support apparatus may be located on a communication path between the programmable controller apparatus and the remote input and output apparatus and may be an apparatus configured to passively monitor communication data. The data collecting device may include a transmission request command issue device for passively monitoring communication data transmitted between the programmable controller apparatus and the remote input and output deice to oversee signal state of the predetermined terminal of the input unit or the output unit of the remote input and output apparatus and issuing a transmission request command to request transmission of time lag or deterioration characteristic amount to the remote input and output apparatus via message communication supported by the field bus in response to a detection of an edge of the signal state in a predetermine direction, and a data storing device for receiving time lag or deterioration characteristic amount from the remote input and output apparatus in response to the transmission request command and storing to a predetermined memory. The threshold value determining device may include a setting request commend issue device for issuing a setting request command to request the remote input and output apparatus to set the deterioration diagnosis threshold value determined by the threshold value determining device. The remote input and output apparatus may include a response request command processing device for transmitting the time lags primarily stored in the time lag registers or deterioration characteristic amount generated base on the time lags to the originating device of a predetermined transmission request command in response to the command via message communication, and a setting request command processing device for carrying out a deterioration diagnosis threshold value setting process based on the deterioration diagnosis threshold value attached to a predetermined setting request command in response to the reception of the command via message communication.

According to the present invention, efforts for determining threshold value can be reduced, for example, in case of introduction, in the PLC system including this type of external equipment deterioration diagnosis function. Also, since its constant operation is assured during the introduction and during the system operation, data with high reliability can be collected.

BRIEF DESCRIPTION OF THE DRAWINGS

FIGS. 5A and 5B show explanatory diagrams of time tag settings of the slave (first embodiment);

FIGS. 6A and 6 B show explanatory diagrams of logging settings to a passive monitor (first embodiment);

FIGS. 8A and 8 B show explanatory diagrams of settings of the slave (second embodiment);

FIG. 9 shows an explanatory diagram of logging settings of a passive monitor (second embodiment);

FIG. 12 shows an explanatory diagram showing settings of a passive monitor;

FIG. 14 shows an explanatory diagram showing a content of setting frame;

FIGS. 16A and 16B show explanatory diagrams of settings of the slave;

DETAILED DESCRIPTION OF THE PREFERRED EMBODIMENTS

A preferred embodiments of the present invention will be explained in detail with reference to the drawings. A structural diagram of a PLC system according to the present invention is shown in FIG. 1.

Figure 1:
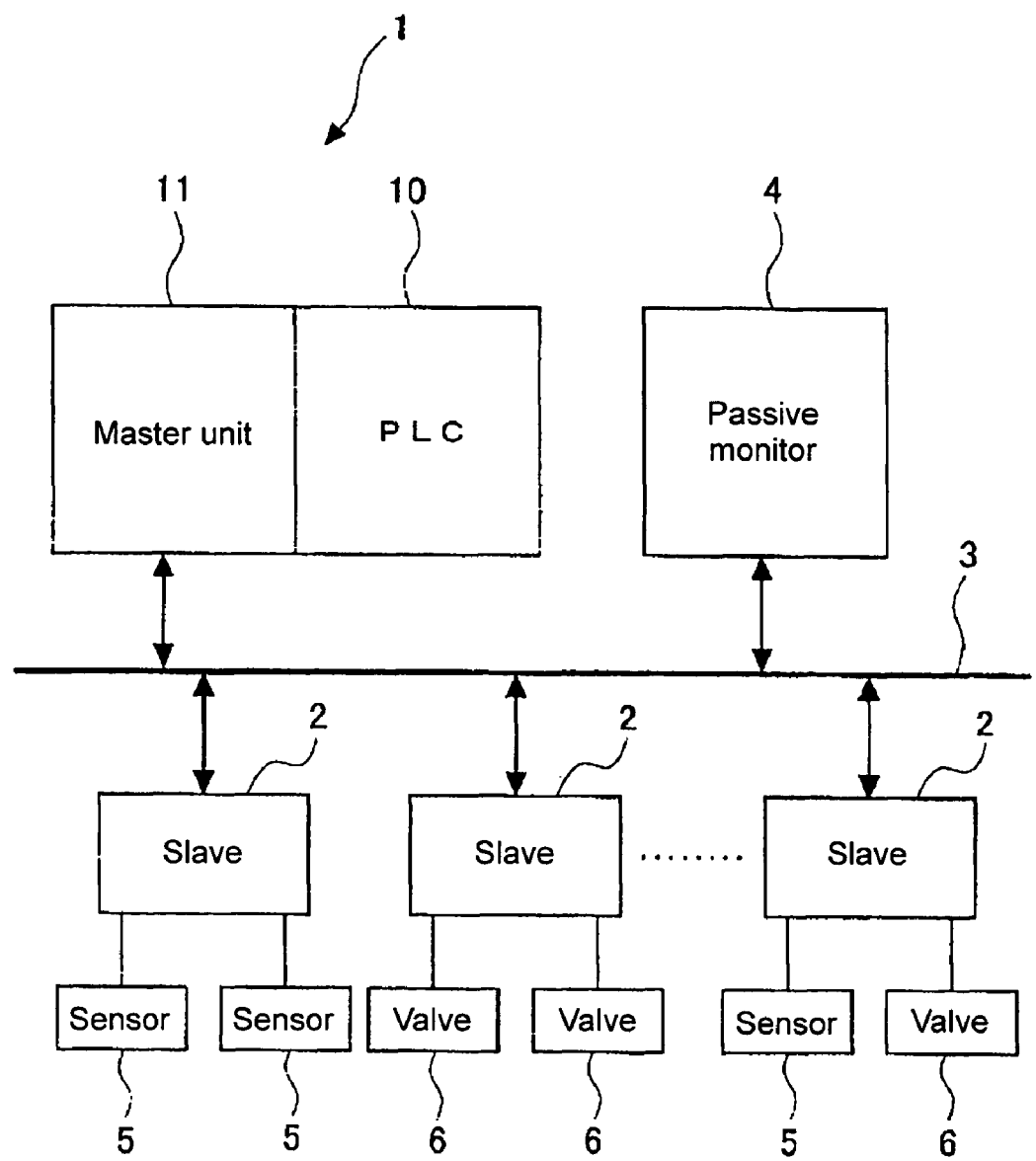
FIG. 1 shows a configuration diagram showing a PLC system according to the present invention.

As shown in FIG. 1, in the PLC system, a PLC apparatus 1 and a plurality of slaves (remote input/output apparatuses) 2 communicate each other via a field bus 3 and, a passive monitor 4 is provided on a communication paths between the PLC apparatus 1 and the slaves 2 for passively monitoring communication data transmitted therebetween.

Figure 2:
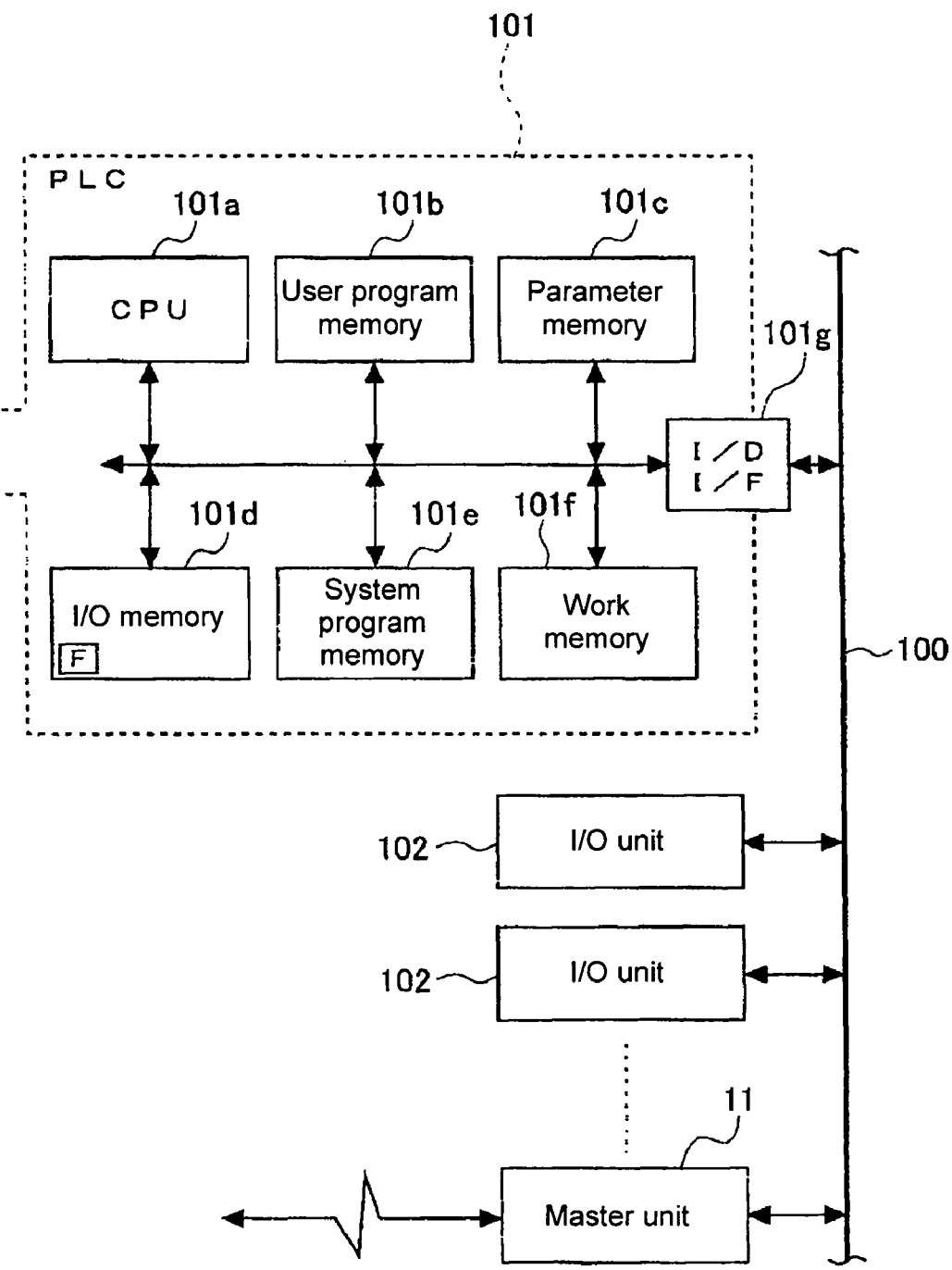
FIG. 2 shows a block diagram showing a detail of a CPU unit and a structure of the PLC system.

In the present embodiment, the PLC apparatus 1 is composed of a PLC 10 and a master unit 11. As shown in FIG. 2, the PLC 10 includes a CPU unit 101 for integrated control of the entire PLC and a plurality of I/O units 102, 102, . . . for operating as input units for receiving signals from external equipments and output units for transmitting signals to the external equipments.

As shown in FIG. 2, the CPU unit 101 includes a CPU 101a for integrated control of the operations in the entire CPU unit, a program memory 101b for storing a user program in which a preferable control specification is written in accordance with user's instruction, a parameter memory 101c for storing various parameters required for calculations; an input region for storing input data corresponding to signals received from the input unit of the programmable controller apparatus, an output region for storing output data corresponding to signals to be transmitted from the output unit of the programmable controller apparatus, a remote input region for storing input data corresponding to signals received from a remote input/output apparatus, a remote output region for storing remote output data corresponding to signals to be transmitted from the remote input/output apparatus, an I/O memory 101d for including at least deterioration diagnosis flag (F) which can be referred to in accordance with user's instruction, a system program memory 101e for storing system program corresponding to such as an input and output update process or an instruction execution process, mentioned below, and a work memory 101f used as a work area for various calculations.

In the drawing, a reference number "101g" represents an I/O interface unit for connecting the system bus 100 and the CPU unit 101.

The CPU 101a is configured to execute various system programs stored in the system program memory 101e at least for realizing a function as an input/output update means, a function as a program execution means, and a function as a deterioration diagnosis flag control means.

As is well known to a person skilled in the art, this type of PLC is configured to cyclically execute an input/output update process, a program execution process, and a system service process. Further, in the present embodiment, a deterioration diagnosis flag control process is also executed.

The input/output update process includes a device side input/output update process for communicating data between the I/O units 102 which constitute the input/output unit of the PLC apparatus 1 and the input/output region of the I/O memory 101d via the system bus 100 and a remote input/output update process for communicating data between the slave 2 and the remote input/output region of the I/O memory 101d via the field bus 3.

The program execution process is a process to execute a user program stored in the user program memory 101b with reference to content of the I/O memory 101*d* and rewrite content of the output region of the I/O memory 101*d* and the remote output region in accordance with the execution result.

The deterioration diagnosis flag control process is a process to control on-off of the deterioration diagnosis flag (F) in the I/O memory 101*d* in accordance with the deterioration result notified by the remote input/output apparatus via the field bus. As described above, the deterioration diagnosis flag (F) can be referred based on user's instruction and the user can arbitrary realize a warning process in a case that external equipment is deteriorated or an interlock process or maintenance by providing a proper ladder diagram activated based on the deterioration diagnosis flag (F).

Although the internal parts of the master unit 11 is not illustrated in detail, the master unit 11 is configured to carry out synchronization with the CPU unit 101 and update inputs and outputs cyclically, include a function for communicating asynchronously with the slaves 2 to execute the input/output update process with the slaves 2, and include own microprocessor to realize those processes. Accordingly, when a proper firmware is executed in the microprocessor, own processes can be realized in addition to communication process. As one of own processes, a function similar to that of the passive monitor 4 may be realized by receiving a designated data from the transmitted or received data.

Figure 3:
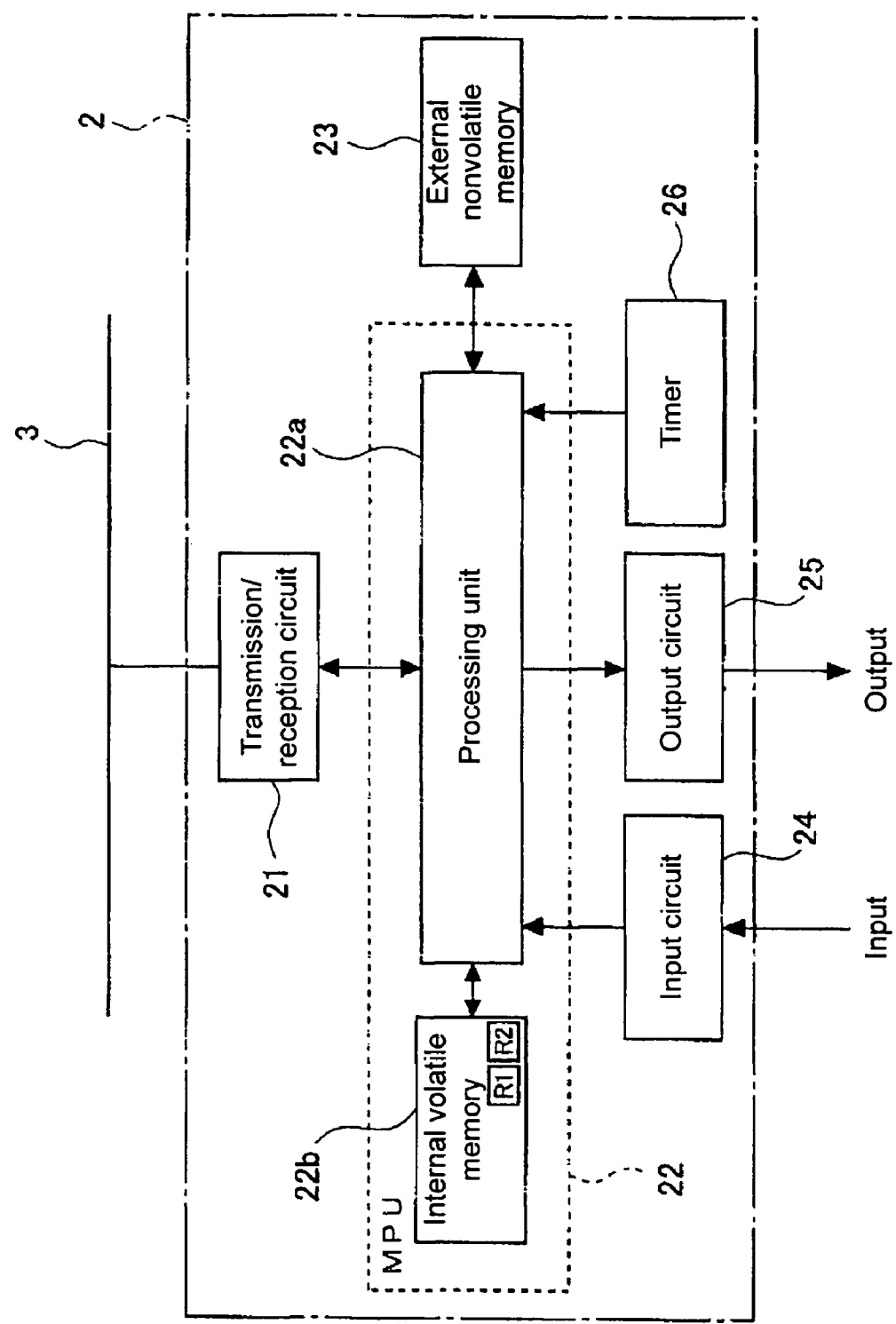
FIG. 3 shows a block diagram showing an internal structure of a slave.

FIG. 3 shows a block diagram showing an internal structure of the slave 2. The slave 2 is connected to the field bus 3 and includes a transmission/reception circuit 21 for transmitting and receiving data, an MPU 22 connected to the transmission/reception circuit 21, an output circuit 25 connected to an output equipment, and an input circuit 24 connected to an input equipment. Further, the slave 2 includes an external nonvolatile memory 23 and a timer (internal clock) 26.

The transmission/reception circuit 21 includes a function for receiving a frame which is transmitted from the master unit 11 and flows in the field bus 3, analyzing its header to determine whether or not the frame is addressed to own device, and receiving only a frame addressed to own device to provide to the MPU 22 and a function for outputting a transmission frame (for example, a frame to transmit IN data addressed to the master unit 11) given from the MPU 22 to the filed bus 3.

The MPU 22 is configured to execute a predetermined process in accordance with information stored in data portion of the frame received from the transmission/reception circuit 21. A basic function of the MPU 22 is to transmit a control signal for switches on and off of a predetermined OUT terminal with respect to the output circuit 25 in accordance with OUT data in the data portion. The MPU 22 also includes a function for obtaining on-off state of an input terminal via the input circuit 24, generating a frame to transmit the obtained data as an IN data to the master unit 11, and providing it to the transmission/reception circuit 21.

As is well known, an activation of the external equipment connected to the slave 2 is carried out as follows. When a result of cyclic execution of user program installed in the CPU unit 101 of the PLC 10 fits a predetermined condition, the master unit 11 is notified to turn on the OUT terminal of the slave 2 and the master unit 11 transmits a predetermine frame (OUT data) to the relative slave 2 according to the communication cycle. The slave 2 turns on the OUT terminal connected to the external equipment in accordance with the received frame (OUT data). Accordingly, output equipments constituting the external equipment (for example, relay, electromagnetic valve, driving cylinder, or solenoid plunger) are activated.

Loading signal from the external equipment connected to the slave 2 is carried as follows, as is well known. When the input equipment constituting the external equipment (for example, limit switch, optoelectronic switch, or proximity switch) is turned on, the MPU 22 can obtain, via the input circuit 24, that the relevant IN terminal turns on so that the MPU 22 transmits a frame as IN data to the master unit 11 at a timing of transmitting own frame. The master unit 11 provides the obtained IN data when refresh process is carried out in the PLC unit 10.

In this way, the slave 2 includes the input circuit (input unit) 24 for loading signals from the external equipment, the output circuit (output unit) 25 for transmitting signals to the external equipment, and a input/output update means for transmitting input data corresponding to the signal loaded by the input circuit 24 to the PLC apparatus 1 via the field bus 3 and transmitting signal corresponding to output data received from the PLC apparatus 1 via the field bus 3 by the output circuit 25.

The external equipment deterioration diagnosis function provided to the slave 2 will be explained. Basically, this deterioration diagnosis function is practically the same as that disclosed by the applicant in Japanese Patent Application Laid-Open No. 2003-295914.

Summarizing it, the slave 2 includes at least a time lag measurement means for measuring time lag between a predetermined signal edge of one terminal and a predetermined signal edge of the other terminal in respective one or more predetermined pair of terminals constituting the input circuit 24 or the output circuit 25, a deterioration diagnosis means for comparing the time lag in each terminal, which is obtained by the time lag measurement means, respectively with one or more time lag register (R1, R2) primarily stored and a predetermined threshold value (TH) of the deterioration characteristic amount generated based on one or more time lag stored in the time lag register (R1, R2) in order to diagnose deterioration of the external equipments relative to the terminals, and a diagnostic result notify means for notifying the deterioration diagnosis result from the deterioration diagnosis means to the programmable controller apparatus via the field bus.

Figure 4:
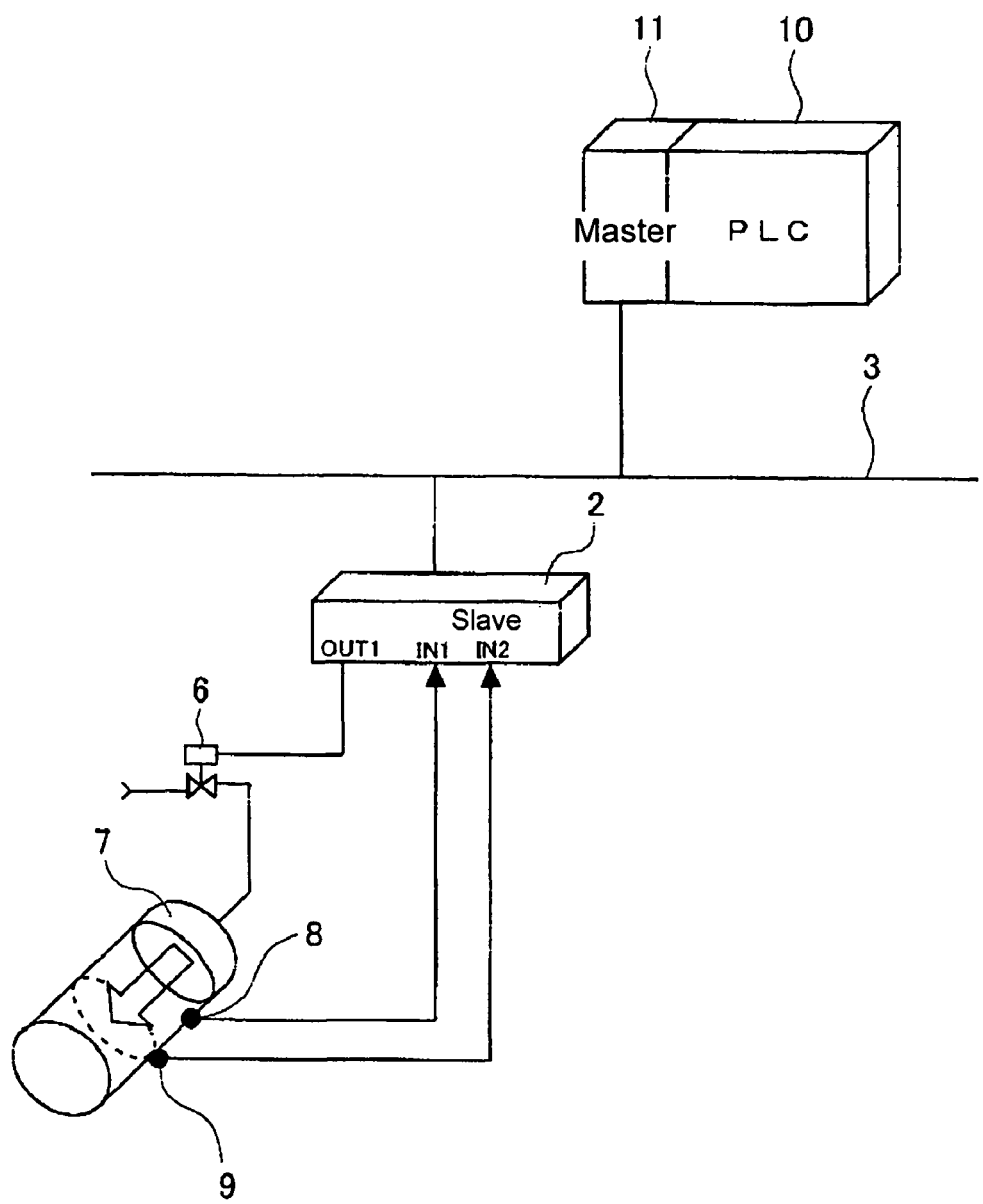
FIG. 4 shows an explanatory diagram of a specific example of a deterioration diagnosis of external equipment.

FIG. 4 shows an explanatory diagram of a specific example of a deterioration diagnosis of external equipment. As show in the figure, it is assumed that a first pair of terminals are made of a first terminal (OUT 1) of the output unit and a first terminal (IN1) of the input unit in the slave 2 and, similarly, a second pair of terminals are made of the first terminal (IN1) of the input terminal and a second terminal (IN2) of the input terminal.

As shown in FIG. 4, one terminal (OUT1) consisting the first pair of terminals is connected to an electromagnetic valve 6 for opening and closing to control pressurized air to a driving cylinder 7 and the other terminal (IN1) is connected to an operation start sensor 8 of the driving cylinder 7. Further, one terminal (IN1) consisting the second pair of terminals is connected to the operation start sensor 8 of the driving cylinder 7 and the other terminal (IN2) is connected an operation complete sensor 9 of the driving cylinder 7.

On the other hand, as shown in FIG. 5, changeable time tags having a predetermined settings are provided in the slaves 2. These time tags can be set for each device of the slaves 2 and time tags for device No. 1 and device No. 2 are shown in the figure.

When it is assumed that the slave 2 shown in FIG. 4 is the device No. 2, settings of time tag is prescribed so that timekeeping starts at on edge of the terminal (OUT1) and ends at off edge of the terminal (IN1) in order to obtain time lag (T1). Also it is prescribed so that timekeeping starts at off edge of the terminal (IN1) and ends at on edge of the terminal (IN2) in order to obtain time lag (T2).

According to the setting of time tag, the slave 2 measures relevant time lags (T1, T2) and primarily store it to time lag registers (R1, R2) by an operation of the "time lag measurement means." Further, the slave 2 reads the time lag registers (R1, R2), generates a deterioration characteristic amount (T1×T2), and compares the deterioration characteristic amount (T1×T2) with the predetermined threshold value (TH) in order to diagnose deterioration of the external equipments relative to the terminals (OUT1, IN1, IN2) by an operation of the "deterioration diagnosis means."

As seen in the present embodiment, when time tag (T1) is set so that timekeeping starts at on edge of the terminal (OUT1) and ends at off edge of the terminal (IN1) in order to obtain time lag (T1), and timekeeping starts at off edge of the terminal (IN1) and ends at on edge of the terminal (IN2) in order to obtain time lag (T1), the time lag (T1) represents degree of deterioration of an actuator while the time lag (T2) represents degree of deterioration of the controlled device or system itself. Accordingly, the value of the deterioration characteristic amount (T1×T2) which is a product of those time lags sensitively represents degree of deterioration of entire external equipments including the actuator, the controlled device. When the value is compared with a predetermined threshold value, the deterioration of the external equipments can be diagnosed with high accuracy.

The deterioration diagnosis result obtained in this way is transmitted to the PLC apparatus 1 via the master unit 11 by the operation of the "deterioration diagnosis means." After that, it is properly reflected to the state of the deterioration diagnosis flag (F) in the I/O memory 101d by the operation of the "deterioration diagnosis flag control means" in the PLC apparatus 1.

Some innovations relative to the determination of the threshold values for deterioration diagnosis, which is an important point of the present invention, will be explained in detail. In order to bring such external equipment deterioration diagnosis means into the PLC system, properly deterioration determination threshold values (TH, or TH-H, TH-L) is required to be set in advance.

For this, a process for storing (so-called logging process) is required to store measurement value of time lag data with respect to each relevant pair of terminals (measurement value is obtained by the remote input/output apparatus itself) while the PLC apparatus and the remote input/output apparatus is actually operated. The logging process is sometimes needed to be continued for one or two month in accordance with the types of controlled device and system.

Figure 10:
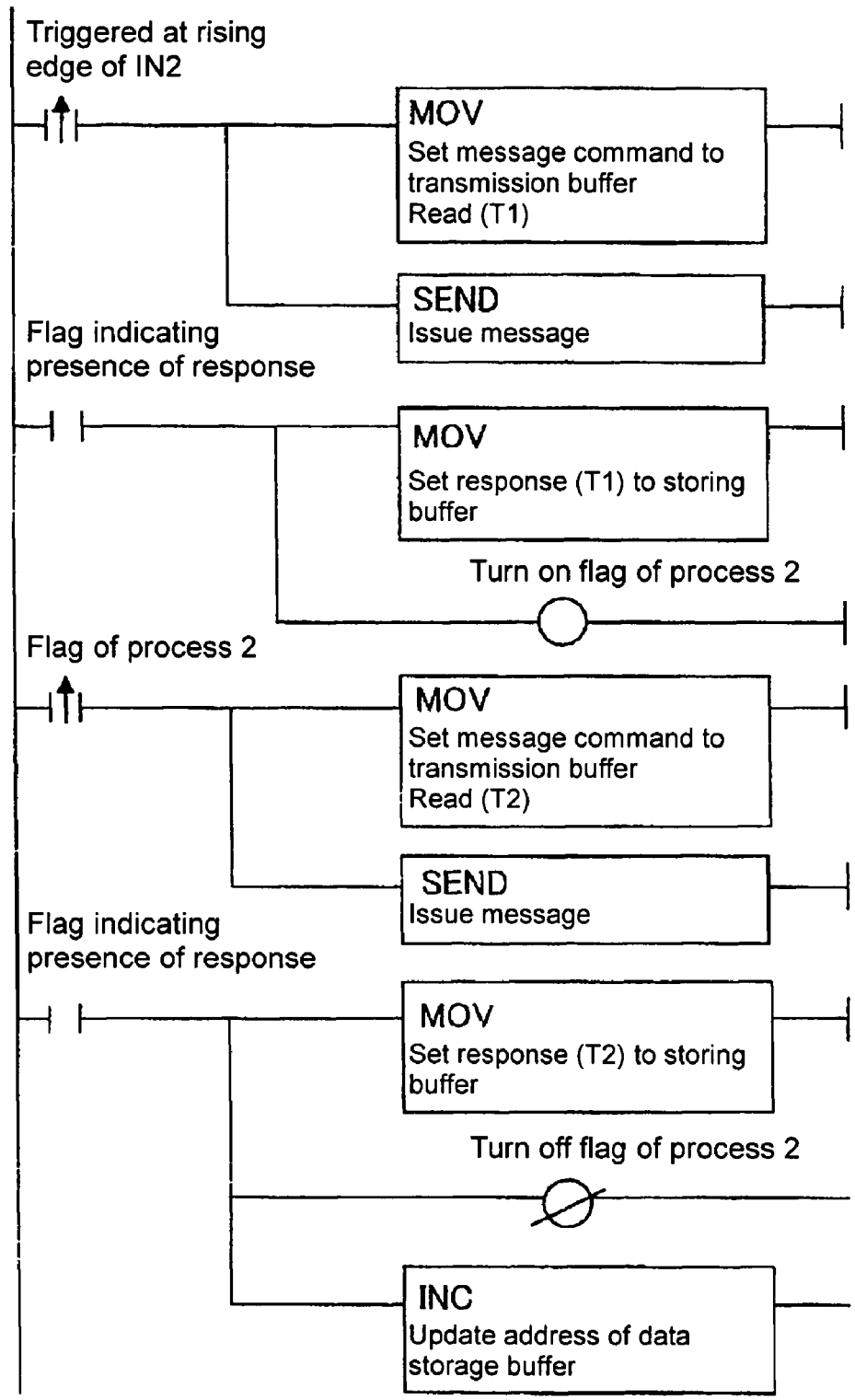
FIG. 10 shows a ladder diagram showing an example of a user program for reading a time lag (T1, T2)

In conventional, the logging process is carried out by installing a logging program, for transferring time lag data generated in a remote input/output apparatus to a PLC apparatus and storing it, into a user program of the PLC apparatus consisting the PLC system. Accordingly, when there exist a plurality of remote input/output apparatuses and there exist a plurality of subject to be diagnosed in each remote input/output apparatus, the program shown in FIG. 10 should be written in the user program for each subject to be diagnosed and large amount of work is required.

When such program used for logging process is added, entire volume of the user program increases. Accordingly, cycle time in the PLC apparatus side slightly varies from that during the system operation and reliability of the time lag data that is obtained in such condition may not always maintained.

In addition, a conventional threshold value determination process is configured to determine a threshold value used for determination based on checking all obtained data in actual and confirming whether the maximum value will not be over the threshold value. Accordingly, in order to maintain reliability of the threshold value used for determination, it is required to collect data as much as possible during a long term logging process, so that it necessarily takes very long time to determine the threshold value.

Thee present embodiment will provide, firstly, a solution for a problem (first problem) occurred due to installing means for logging process into the user program and, secondly, a solution for a problem (second problem) occurred due to determining a threshold value for determination based on checking all obtained data in actual and confirming whether the maximum value will not be over the threshold value.

[Regarding Solution for the First Problem]

As shown in FIG. 1, the passive monitor apparatus 4 or the master unit 11 is employed as a device adapted to passively monitor communication data between the PLC apparatus 1 and the slaves 2. In the present embodiment, after-mentioned "transmission request command issuing means," "data storing means," and "stored data outputting means" are provided to the passive monitor 4 and the master unit 11 and after-mentioned "transmission request command processing means" is provided to the slaves 2.

The "transmission request command issuing means" is configured to monitor signal conditions of the input unit or the output unit in the slave 2 by passively monitoring communication data between the PLC apparatus 1 and the slaves 2, and to issue a transmission request command for requesting transmission of time lag (T1, T2) or deterioration characteristic amount (T1×T2) to the slaves 2 via message communication supported by the field bus 3 in response to the detection of edge of the signal condition in a predetermine direction.

The "data storing means" is configured to receives time lags (T1, T2) or deterioration characteristic amount (T1×T2) transmitted from the slaves 2 in response to the transmission request command and to store in a predetermined memory.

The "stored data outputting means" configured to output a series of data stored in the predetermined memory by the data storing means to outward in response to a predetermined reading operation.

The "transmission request command processing means" is configured to returns the time lags (T1, T2) primarily stored in the time lag registers (R1, R2) or deterioration characteristic amount (T1×T2) generated based on the time lags to the devices 4 and 11, which transmit the command, in response to the reception of a predetermined transmission request command via message communication.

The respective means having these functions ("transmission request command issuing means," "data storing means," "stored data outputting means") may be installed into the passive monitor 4 or the master unit 11 as firmware.

The passive monitor 4 is basically made by installing a predetermined tool software into a personal computer and it is described in detail in Japanese Paten Application Laid-Open No. 2000-216798, which is proposed by the applicant.

The passive monitor 4 is configured to passively receive frames transmitted in the PLC system via the field bus 3 and, when receiving, decode detailed information in frame header or data field of the received frame according to frame information. When the frame is found to be necessary for monitoring or logging after decoding the frame according to the frame information, the frame is obtained.

FIGS. 6A and 6B show logging settings of the passive monitor 4 for necessary operation (first embodiment). FIG. 6A shows load timing settings and FIG. 6B shows calculation tag settings. In this example, only time lag data (T1, T2) is obtained from the slave 2 and calculation of deterioration characteristic amount (T1×T2) is carried out by the passive monitor 4.

Figure 7:
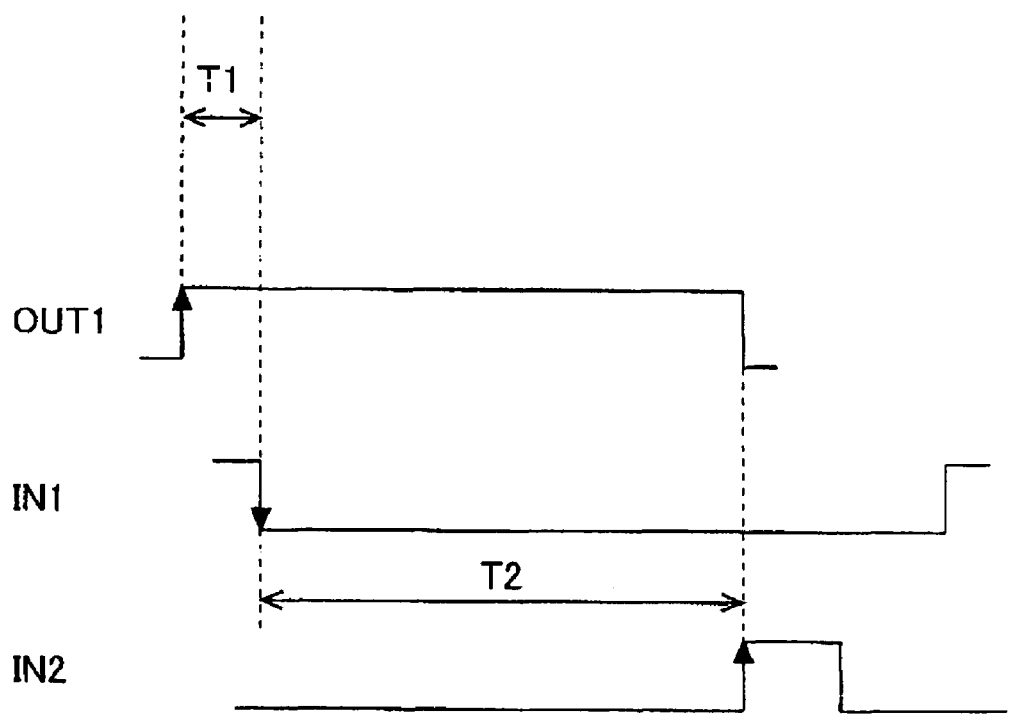
FIG. 7 shows an explanatory diagram of an example of time lag measurement in a signal change between a pair of terminals.

As shown in FIG. 7, with reference to the settings shown in FIG. 5, the slave 2 repeats processes of measuring time lag (T1) between the on-edge of the terminal (OUT1) and the off-edge of the terminal (IN1) and time lag (T2) between the off-edge of the terminal (IN1) and the on-edge of the terminal (IN2) and storing them into the time lag register (R1, R2).

The passive monitor 4 monitors signal state of the terminal (IN2) with reference to the settings shown in FIGS. 6A and 6B and issues transmission request command corresponding to the time lag (T1) or the time lag (T2) to the slave 2 having relevant device number (node) with every detecting on-edge.

When the transmission request command issued from the passive monitor 4 is received by the slave 2 having relevant device number, the slave 2 retrieves relevant time lag data (T1 or T2) from the time lag register (R1, R2) and provides a time stamp on the data to transmit to the passive monitor 4 in response to the transmission request command.

When the response transmitted from the slave 2 is received by the passive monitor 4, the passive monitor 4 obtains the time lag data (T1 or T2) attached to the response and stores it into the predetermined nonvolatile memory. Further, with reference to the calculation tag settings shown in FIG. 6B, the passive monitor 4 carries out calculation process according to a predetermined arithmetic expression to calculate deterioration characteristic amount (T1×T2=Y1) with every obtaining a pair of time lag data (T1, T2). Then, the passive monitor 4 associates the deterioration characteristic amount (T1×T2=Y1) wit the time lag data (T1, T2) and store in the predetermined nonvolatile memory.

By repeating the above operations, time lag data (T1, T2) and the deterioration characteristic amount (T1×T2=Y1) for each instance of time are stored (data logging) in pairs in the nonvolatile memory such as personal computer hard disk which has a function of the passive monitor 4.

After a proper period for data logging, a predetermined read is carried out by using keyboard or mouse of a personal computer, the series of data stored in the nonvolatile memory such as personal computer hard disk is displayed on the screen or printed by a printer. According to the displayed or printed data array, a threshold value for deterioration diagnosis can be determined.

FIG. 8 shows settings of the slave 2 for necessary operation (second embodiment) and FIG. 9 shows logging settings of the passive monitor 4 for necessary operation (second embodiment). In these examples, the slave 2 is configured to carry out not only measurement and obtainment of time lags (T1, T2) but also calculation of deterioration characteristic amount (T1×T2) based on them.

With reference to the settings (time tag) shown in FIG. 8, the slave 2 repeats processes of measuring time lag (T1) between the on-edge of the terminal (OUT1) and the off-edge of the terminal (IN1) and time lag (T2) between the off-edge of the terminal (IN1) and the on-edge of the terminal (IN2) and storing them into the time lag register (R1, R2).

In addition, with reference to the settings (calculation tag) shown in FIG. 8, the slave 2 calculates deterioration characteristic amount (T1×T2) with every obtainment of the time lags (T1, T2), adds a calculation tag (X1) to the calculation result, and stores it into a predetermined nonvolatile memory (register R3).

With reference to the settings shown in FIG. 9, the passive monitor 4 monitors signal state of the terminal (IN2) and issues transmission request command corresponding to the deterioration characteristic amount (T1×T2=X1) to the slave 2 having relevant device number (node) with every detecting on-edge.

When the transmission request command issued from the passive monitor 4 is received by the slave 2 having relevant device number, the slave 2 retrieves relevant deterioration characteristic amount (T1×T2=X1) from the internal time lag register (R3) and provides a time stamp on the data to transmit to the passive monitor 4 in response to the transmission request command.

When the response transmitted from the slave 2 is received by the passive monitor 4, the passive monitor 4 obtains the characteristic amount (T1×T2=X1) attached to the response, adds a predetermined tag (Y1), and stores it into the predetermined nonvolatile memory.

By repeating the above operations, the deterioration characteristic amounts (T1×T2=Y1) for each instance of time are stored (data logging) in the nonvolatile memory such as personal computer hard disk which has a function of the passive monitor 4.

After a proper period for data logging, a predetermined read is carried out by using keyboard or mouse of a personal computer, the series of data stored in the nonvolatile memory such as personal computer hard disk is displayed on the screen or printed by a printer. According to the displayed or printed data array, a threshold value for deterioration diagnosis can be determined.

[Regarding Solution for the Second Problem]

As shown in FIG. 1, the passive monitor apparatus 4 or the master unit 11 is employed as a device adapted to passively monitor communication data between the PLC apparatus 1 and the slaves 2. In the present embodiment, the passive monitor 4 and the master unit 11 are also used as a threshold value setting support apparatus. Then, after-mentioned "data collecting means," "threshold value determining means," and "threshold value setting means" are provided to the threshold value setting support apparatus and after-mentioned "transmission request command processing means" is provided to the slaves 2.

The "data collecting means" is configured to collect data corresponding to time lag or deterioration characteristic amount, which are generated in the remote input/output apparatus, without installing data collecting means into user program of the programmable controller apparatus.

The "threshold value determining means" is configured to determine a threshold value for deterioration diagnosis in use of statistical method based on data corresponding to time lag or deterioration characteristic amount corrected by the data collecting means.

The "threshold value setting means" is configured to set the threshold value for deterioration diagnosis, which is determined by the threshold value determining means, to the remote input/output apparatus.

The respective means having these functions ("data collecting means," "threshold value determining means," and "threshold value setting means") may be installed into the passive monitor 4, the master unit 11, or the slaves 2 as firmware.

Figure 11:
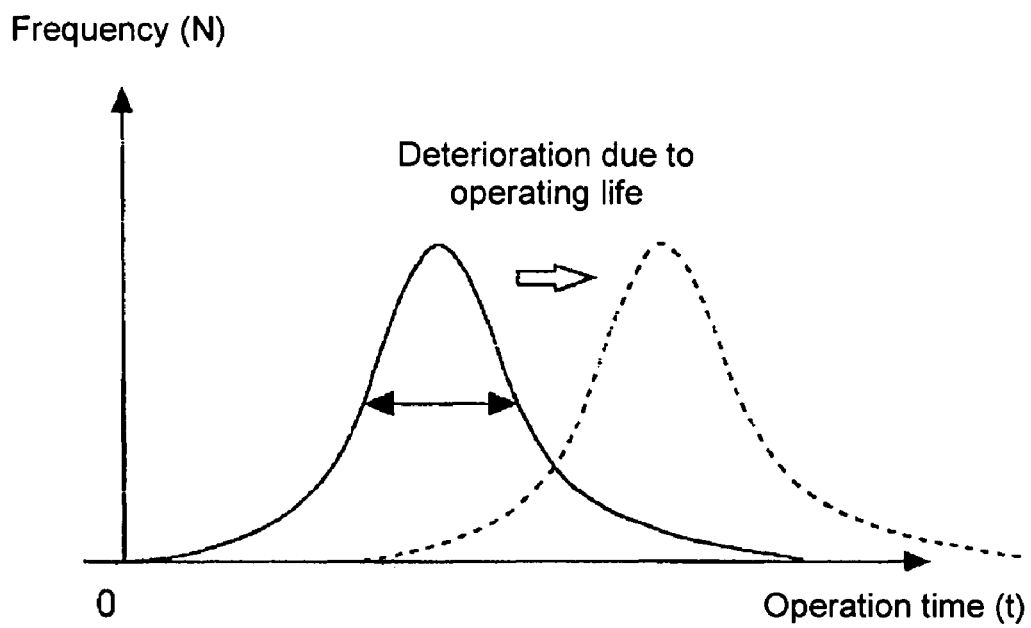
FIG. 11 shows a histogram showing delay of operation time due to deterioration with operating life.

FIG. 11 is a histogram showing delay of operation time due to deterioration with operating life. As shown in the drawing, when aging deterioration in the external equipment caused by its operating life arises, time lags between the terminals, which are an operation time, increases. Here, it is recognized that there is almost no variation in operation times. With this, even when the threshold value for deterioration diagnosis is determine by a statistical method, a proper threshold value for deterioration diagnosis may be obtained. Further, since the threshold value for diagnosis may be determined with a relatively small number of logging data, amount of time required for determining the threshold value can be significantly reduced. In more detail, a threshold value for detecting an aging deterioration with operating life can be automatically calculated in use of an average value and standard deviation, which are statistically measured.

Figure 13:
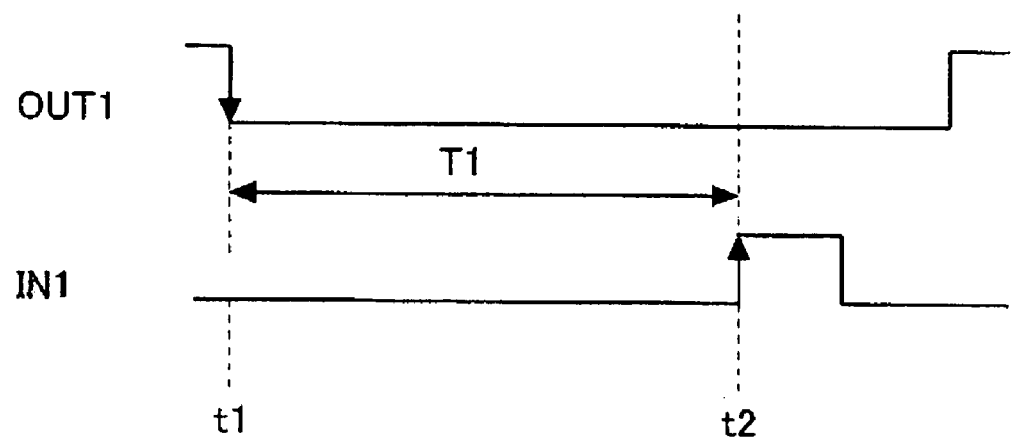
FIG. 13 shows a waveform diagram showing a relationship of connecting pair, predetermined edges, and T1 importing timing.

An embodiment based on the above conception will be explained. As shown in FIG. 13, the slave 2 repeats processes of measuring time lag (T1) between the off-edge of the terminal (OUT1) and the on-edge of the terminal (IN1) and storing it into the time lag register (R1).

FIG. 12 shows settings of the passive monitor 4. As shown in the drawing, calculation data and data log timing is prescribed to a tag (Y1). As the calculation data, device number (slave No.), time tag, variation coefficient (A), type for prescribing number of times/time, value of number of times/time, and number of sampling are included.

With reference to the calculation data and the data log timing shown in FIG. 12, the passive monitor 4 monitors an arrival of on-edge of the terminal (IN1), which is transmitted from the slave 2 having relevant device number to the PLC apparatus 1 in the input/output update process. Then, the passive monitor 4 issues a transmission request command to the slave 2 having relevant device number.

When receiving the transmission request command, the slave 2 retrieves time lag data (T1) stored in the internal time lag register (R1), adds a time stamp, and transmits it to the passive monitor 4 in response to the transmission request command.

When receiving the response from the slave 2, the passive monitor 4 retrieves attached time lag data (T1) and stores it to a nonvolatile memory such as a hard disk.

By repeating the above operations (issuing a transmission request command and receiving a response) for a predetermined sampling number or for a predetermined period of time, a predetermine number of time data (T1) is stored in the memory of the passive monitor 4.

After that, the passive monitor 4 carries out a statistical calculation according to equations (1) to (3) in order to a threshold value for deterioration diagnosis (T).

Average Value $$\bar{x} = \sum_i Xi/n \qquad \text{Equation (1)}$$

Standard Deviation $$\sigma = \sqrt{\Sigma(Xi-\bar{X})^2/(n-1)} \qquad \text{Equation (2)}$$

Threshold Value $$T = \bar{X} + \sigma \times A \qquad \text{Equation (3)}$$

The passive monitor 4 issues a setting request command including the obtained threshold value (T) to the slave 2 having the relevant device number. FIG. 14 shows a diagram showing an example of frame content of the setting request command issued from the passive monitor 4.

In the side of the slave 2 which receives the setting request command, the threshold value (T) attached to the setting request command is set to the slave 2. In the slave 2, according to the set threshold value (T), a deterioration diagnosis process relative to relevant external equipment is carried out. In this example, the time lag (T1) is simply used as a deterioration characteristic amount and the deterioration diagnosis is implemented by comparing the time lag (T1) and the threshold value (T).

Figure 15:
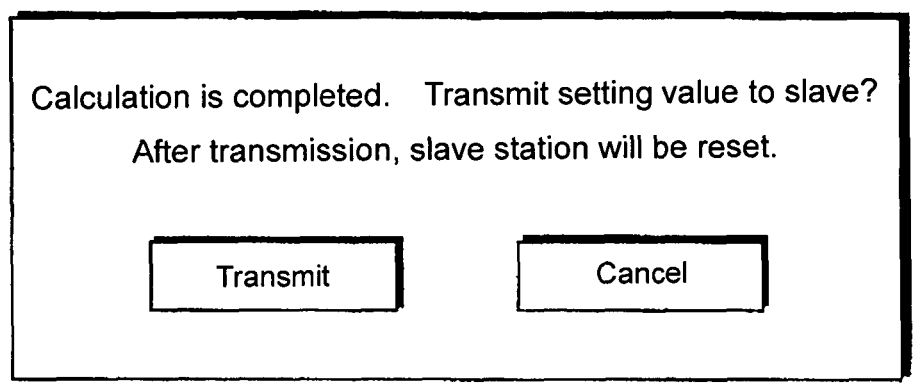
FIG. 15 shows an explanatory diagram showing a screen image of a message.

In the above explanation, when a threshold value (T) is determine by the passive monitor 4, a setting request command including the determined threshold value (T) is transmitted to the relevant slave 2 without preconditions. However, when setting of the slave is required to be reset in advance to the setting of the threshold value (T), it may bring some harmful influence to the controls in the slave. In such case, as shown in FIG. 15, it is preferable to provide "Transmit" button and "Cancel" button on the screen of the personal computer consisting the passive monitor 4 to give an operator a chance to confirm prior to the setting in the slave 2.

Figure 17:
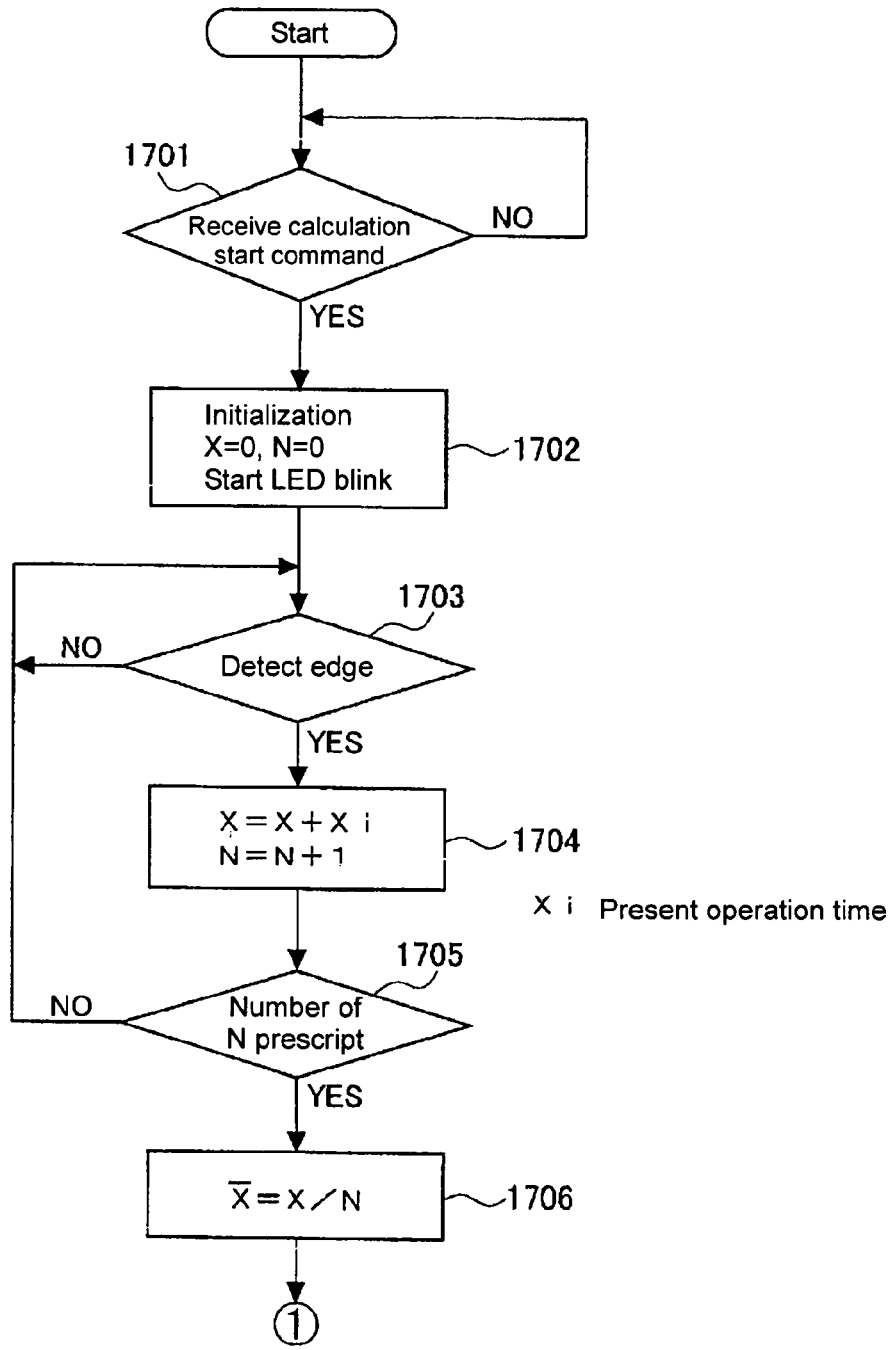
FIG. 17 shows a flowchart showing threshold value calculating procedure (No. 1)
Figure 18:
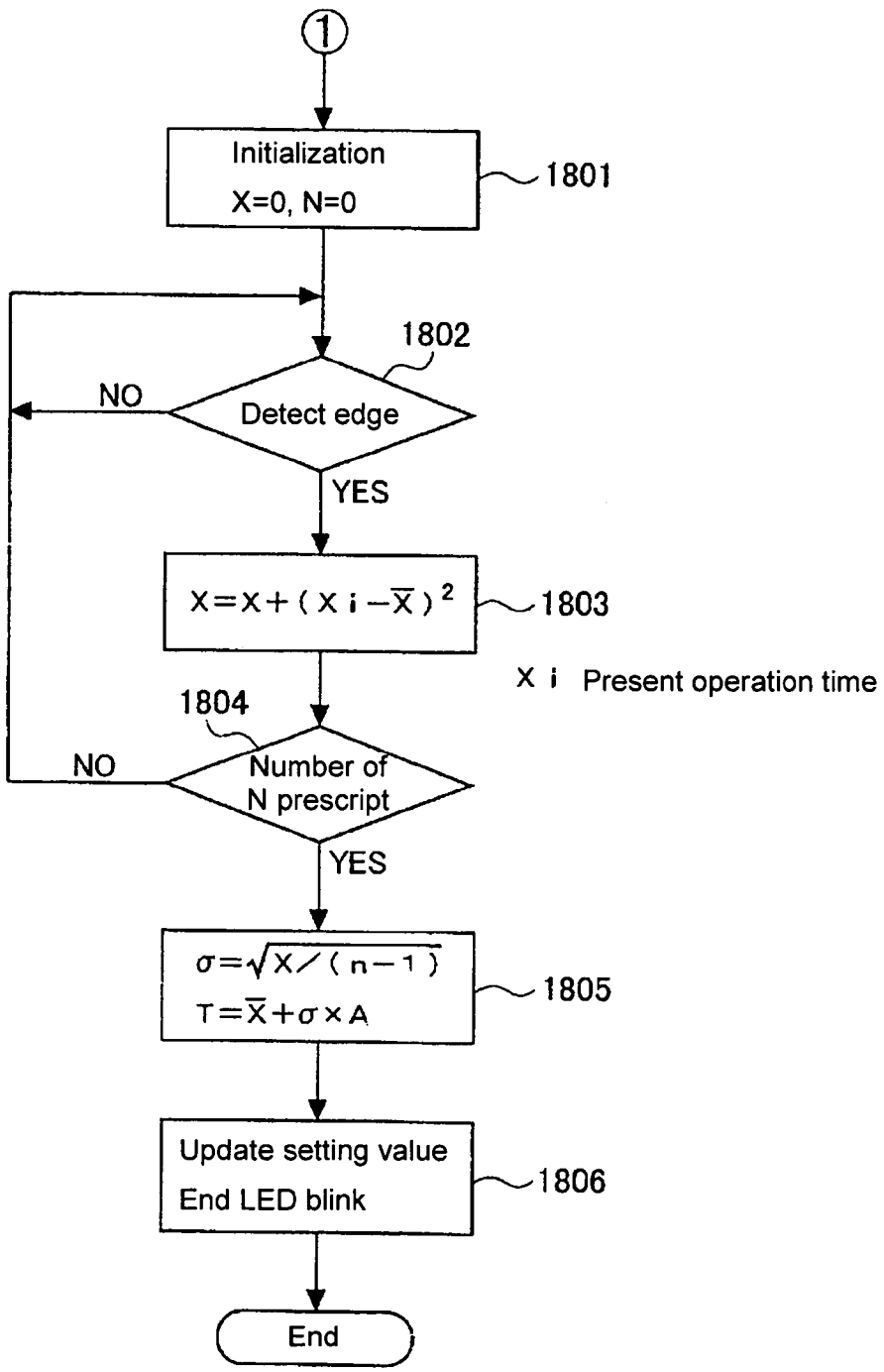
FIG. 18 shows a flowchart showing threshold value calculating procedure (No. 2)

FIGS. 16 to 18 show an example in which a threshold value determining function is provided to the slave itself. In this example, as shown in FIGS. 16A and 16B, condition for start and stop and calculation parameter are set to the slave 2.

Regarding time tag (T1), it waits for a detection of on-edge of the terminal (OUT1) to start timekeeping operation and it waits for a detection of off-edge of the terminal (IN1) to stop the timekeeping operation. Here, the value of the variation coefficient (A) is "4" and number of sampling is "100".

FIGS. 17 and 18 are flowcharts showing threshold value calculation processes. A characteristic of the threshold value calculation processes is that memory capacity is reduced as much as possible when the process is implemented by a computer, in order to realize with a slave 2 which does not include a large-capacity memory.

In the drawing, when the process starts, the slave 2 waits for arrival of a calculation start command from external (step 1701). In such condition, when a calculation start command is received from any of nodes (for example, the passive monitor 4 or the PLC apparatus 1), the slave 2 determines calculation start command reception (step 1701 YES) and, reset an initialization process is promptly carried out (step 1702).

In the initialization process (step 1702), the value of an integration register (X) is reset to "0" and sampling number pointer (N) is reset to "0" while blinking process of LED constituting a display lamp of the slave 2 is carried out.

After that, every time off-edge of the terminal (IN1) is detected (step 1703 YES), a reading process (Xi=T1) of edge time lag (T1) between terminals relative to operation time and an updating process (X=X+Xi) of the integrated value (X) are carried out (step 1704). At the same time, an incrementing process (N=N+1) of a sample number counter (N) is carried out.

The above process (step 1704) is repeated until the value of sampling number counter (N) reaches a prescribed number (step 1705NO). When the value of sampling number counter (N) reaches the prescribed number (step 1705YES), an average value of the time lags (T1) corresponding to the operation time can be obtained by dividing the integrated value (X) with the sampling number (N) (step 1706).

Moving on to FIG. 18, process for calculating a standard deviation (σ) and a threshold value (T) is started. In other words, firstly, an initialization process (step 1801) is carried out, an integrated value (X) of a square of deviation between the average value and every measured values is reset to "0," and the sampling number counter (N) is reset to "0."

After that, every time off-edge of the terminal (IN1) is detected (step 1703YES), a reading process (Xi=T1) of edge time lag (T1) between terminals relative to operation time and an updating process of the previously obtained integrated value (X) of a square of deviation between the average value and every measured values (step 1803) are repeated until the value of the sampling number counter (N) reaches to a prescribed number (step 1804NO).

When the value of sampling number counter (N) reaches the prescribed number (step 1804YES), a standard deviation (σ) is obtaining by calculating square root of division of the integrated value (X) by the sampling number (N-1). At the same time, the threshold value (T) is obtained by adding a product of the standard deviation (σ) and the variation coefficient (A) to the average value of the time lag (T1) (step 1806). The threshold value (T) obtained in this way will be set in the slave 2 and used for deterioration diagnosis process of external equipments.

The above process is primarily composed of the integration process (steps 1704 and 1804), the threshold value (T) can be certainly obtained even with a slave 2, which is a computer with small-capacity memory.

Figure 19:
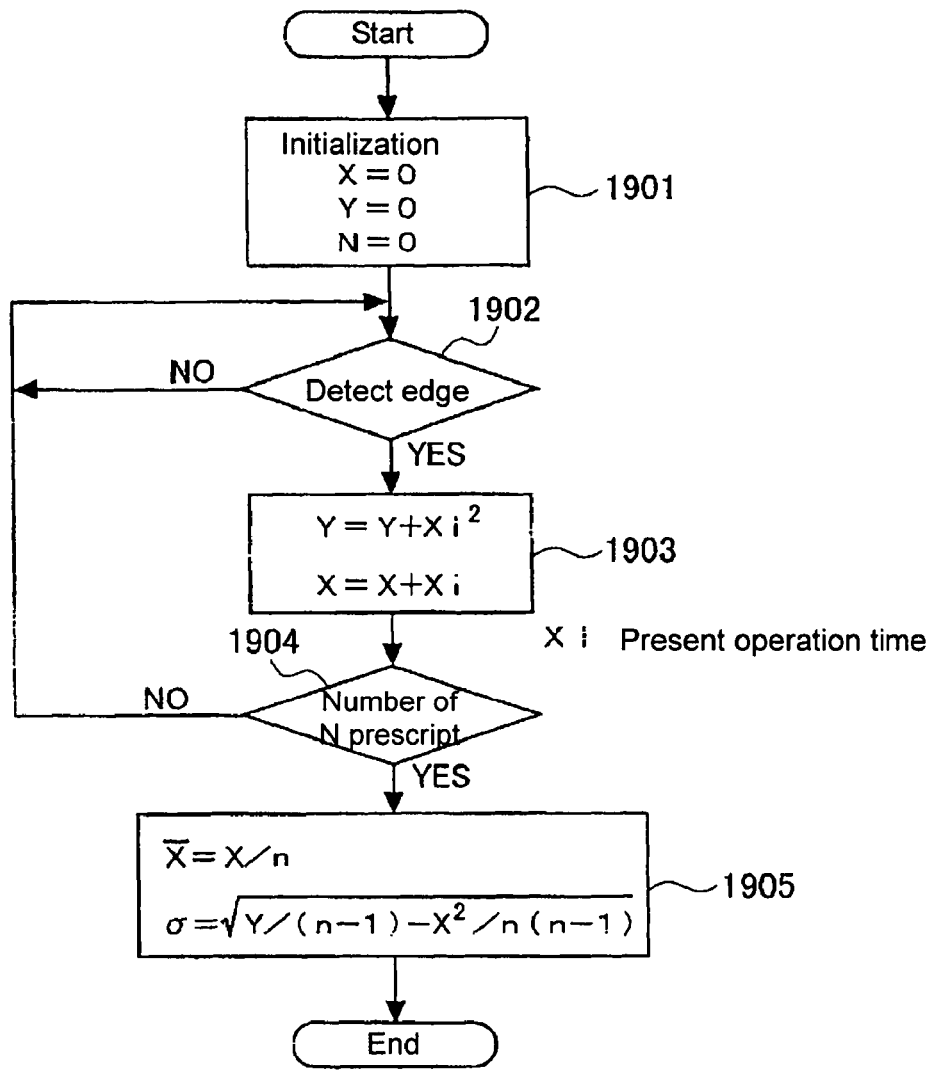
FIGS. 19A and 19B show explanatory diagrams showing standard deviation calculating procedure.

FIGS. 19A and 19B show another example of calculating a standard deviation. In this example, memory capacity required for calculation is reduced by using a modified equation shown in FIG. 19A.

In FIG. 19B, when a process is started, firstly, an initialization process (step 1901) is carried out, an integrated value (X) of every sample values, an integrated value (Y) of square of sample value, and a sampling number counter (N) are reset to "0."

After that, every time off-edge of the terminal (IN1) is detected (step 1902YES), edge time lag (T1) between the terminals corresponding to operation time is read (Xi=T1) and its integration (X=X+Xi) and an integration of its square (Y=Y+Xi2) are obtained (step 1903).

The above process (step 1903) is repeated until the sampling number counter (N) reaches to a prescribed number (step 1904NO). When the sampling number counter (N) reaches the prescribed number (step 1904YES), an average value of the time lags (T1) corresponding to the operation time can be obtained by dividing the integrated value (X) with the sampling number (N) (step 1706). At the same time, a standard deviation (σ) is obtaining by calculating square root of difference between the value divided squared integrated value (Y) with the sampling number (N-1) and the value divided squared integrated value(X) with the N(N-1).

Based on the average value of X, standard deviation (σ), and variation coefficient (A) which are obtained in this way, a threshold value (T) for deterioration diagnosis is obtained as described above and the threshold value (T) is set in the relevant slave 2.

According to the above examples, since a threshold value (T) for deterioration diagnosis is obtained based on the standard deviation (σ), and the variation coefficient (A), a threshold value for deterioration diagnosis, which has relatively high reliability, can be obtained even with a relatively small number of sampling data. Accordingly, amount of time required for obtaining a threshold value can be reduced.

According to the present invention, efforts for determining threshold value can be reduced, for example, in case of introduction, in the PLC system including this type of external equipment deterioration diagnosis function. Also, since its constant operation is assured during the introduction and during the system operation, data with high reliability can be collected.

What is claimed is:
1. A programmable controller system, comprising:
a programmable controller apparatus;
a remote input and output apparatus connected to the programmable controller apparatus via a field bus; and
a monitoring apparatus configured to be located on a communication path between the programmable controller apparatus and the remote input and output apparatus and passively monitor communication data therebetween,
wherein the programmable controller apparatus including:
an input unit for inputting a signal from an external equipment;
an output unit for outputting the signal to the external equipment;
an input and output memory having at least an input region for storing input data corresponding to signal inputted by the input unit of the programmable controller apparatus, an output region for storing output data corresponding to signal to be outputted from the output unit of the programmable controller apparatus, a remote input region for storing input data corresponding to signal inputted by the remote input and output apparatus, a remote output region for storing remote output data corresponding to signal to be outputted from the remote input and output apparatus, and a deterioration diagnosis flag configured to be referred in accordance with a user instruction;
a program memory for storing a user program to which a preferable control specification is written in use of the user instruction;
an input and output update part configured to carry out an input and output update process for transmitting and receiving data between the input unit and the output device unit of the programmable controller apparatus and the input region and the output region of the input and output memory via an internal bus, and a remote input and output update process for transmitting and receiving data between the remote input and output apparatus and the remote input and output update region of the input and output memory via the field bus;
a deterioration diagnosis flag control part configured to control of turning on and off of the deterioration diagnosis flag according to a deterioration diagnosis result notified from the remote input and output apparatus via the filed bus; and
a program execution part configured to execute a user program stored in the program memory with reference to the input and output memory and to rewrite the output region and the remote output region of the input and output memory according to an execution result,
wherein the remote input and output apparatus including:
an input unit for inputting the signal from the external equipment;
an output unit for outputting the signal to the external equipment;
an input and output update part for transmitting an input data corresponding to the signal retrieved by the input unit to the programmable controller apparatus via the field bus and transmitting the signal corresponding to the output data received from the programmable controller apparatus via the field bus from the output unit;
a time lag measurement part for measuring a time lag between a signal edge of a terminal and the signal edge of an other terminal of one or more pair of terminals of the input unit or the output unit;
a time lag register for storing a time lag of each pair of terminals obtained by the time lag measurement part;
a deterioration diagnosis part for comparing a deterioration characteristic quantity generated based on the time lag stored in the time lag register with a predetermined threshold value and diagnosing deterioration of the external equipment connected to the pair of terminals;
a diagnosis result notification part for notifying the deterioration diagnosis result obtained by the deterioration diagnosis part to the programmable controller apparatus via the field bus;

a transmission request command processing part for transmitting, as a response, the time lag stored in the time lag register or the deterioration characteristic quantity generated based on the time lag to a originating device of the transmission request command in response to receiving the transmission request command via a message communication, a time lag measurement part for measuring a time lag (T1) between a signal edge of a first terminal in the output unit and a signal edge of the first terminal in the input unit and a time lag (T2) between a signal edge of the first terminal in the input unit and a signal edge of a second terminal in the input unit;

a time lag register including a first time lag register for storing the time lag (T1) and a second time lag register for storing the time lag (T2);

a deterioration diagnosis part for comparing the deterioration characteristic quantity (T1×T2) generated based on the time lag (T1) stored in the first time lag register and the time lag (T2) stored in the second time lag register with a threshold value (TH) to diagnose deterioration of the external equipment connected to the pair of terminals; and a command processing part for transmitting, as a response, the time lags (T1, T2) stored in the time lag register or the deterioration characteristic quantity (T1×T2) generated based on the time lags to the originating device of the transmission request command in response to receiving the command via the message communication, wherein the monitoring apparatus including:

a transmission request command issue part for passively monitoring communication data transmitted between the programmable controller apparatus and the remote input and output apparatus to observe a signal state of the terminal of the input unit or the output unit of the remote input and output apparatus and issuing a transmission request command to request a transmission of the time lag or the deterioration characteristic quantity to the remote input and output apparatus via a message communication supported by the field bus in response to detecting an edge of the signal state in a predetermined direction;

a data storing part for storing the time lag or the deterioration characteristic quantity from the remote input and output apparatus in response to the transmission request command to a memory;

a stored data output part for outputting a data stored in the memory by the data storing part to an external apparatus in response to a reading operation, a command issue part for issuing a transmission request command to request the time lags (T1, T2) or the deterioration characteristic quantity (T1×T2) to the remote input and output apparatus via the message communication supported by the field bus in response to detecting the edge of the signal state in a predetermine direction;

a data storing part for storing the time lags (T1, T2) or the deterioration characteristic quantity (T1×T2) transmitted from the remote input and output apparatus as a response to the transmission request command to a memory; and a stored data output part for outputting a data stored in the memory by the data storing device to the external apparatus in response to a reading operation.

2. The programmable controller system of claim 1, wherein the monitoring apparatus is provided separately from the programmable controller apparatus and also separately from the remote input and output apparatus and is a passive monitor for monitoring the communication data.

3. The programmable controller system according to claim 1, wherein the monitoring apparatus is provided in the programmable controller apparatus and is a master unit for carrying out a communication with the remote input and output apparatus via the field bus.

4. The programmable controller system of claim 1, wherein the remote input and output apparatus includes a rewritable tag for prescribing measuring start condition and measuring end condition required for obtaining one or more time lags with respect to an external equipment deterioration diagnosis and the time lag measurement part measures each time lag required for the external equipment deterioration diagnosis with reference to the tag.

5. The programmable controller system of claim 1, wherein the remote input and output apparatus includes a rewritable tag for prescribing measuring start condition and measuring end condition required for obtaining one or more time lags with respect to an external equipment deterioration diagnosis and the time lag measurement part measures each time lag required for the external equipment deterioration diagnosis with reference to the tag.

6. The programmable controller system of claim 1, wherein the monitoring apparatus further includes a rewritable tag for prescribing a condition for issuing the transmission request command with respect to the external equipment deterioration diagnosis and wherein the command issuing device issues the transmission request command required for the external equipment deterioration diagnosis with reference to the tag.

7. The programmable controller system of claim 1, wherein the monitoring apparatus further includes a rewritable tag for prescribing a condition for issuing the transmission request command with respect to the external equipment deterioration diagnosis and wherein the command issuing device issues the transmission request command required for the external equipment deterioration diagnosis with reference to the tag.

* * * * *